UNITED STATES PATENT OFFICE.

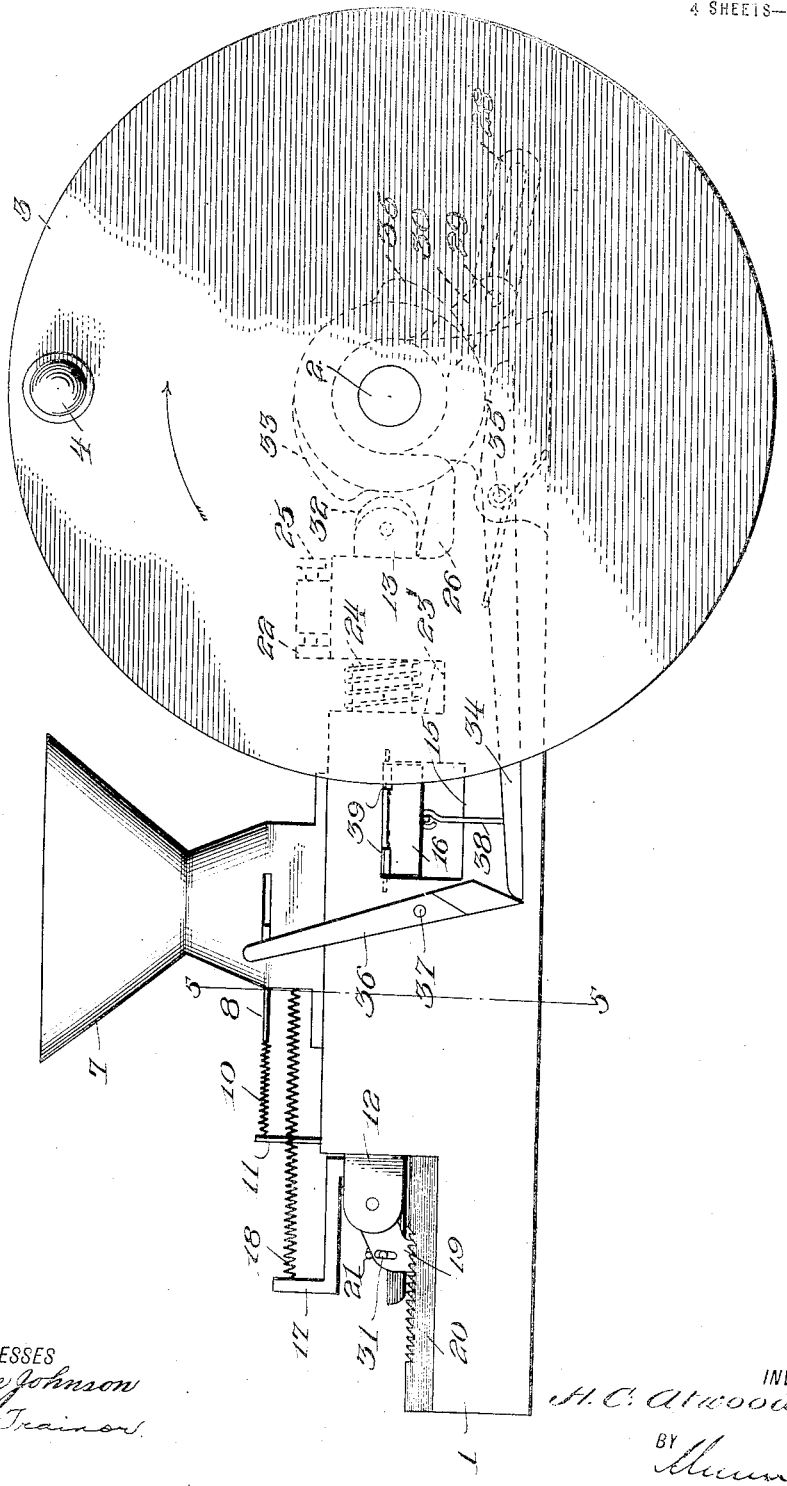

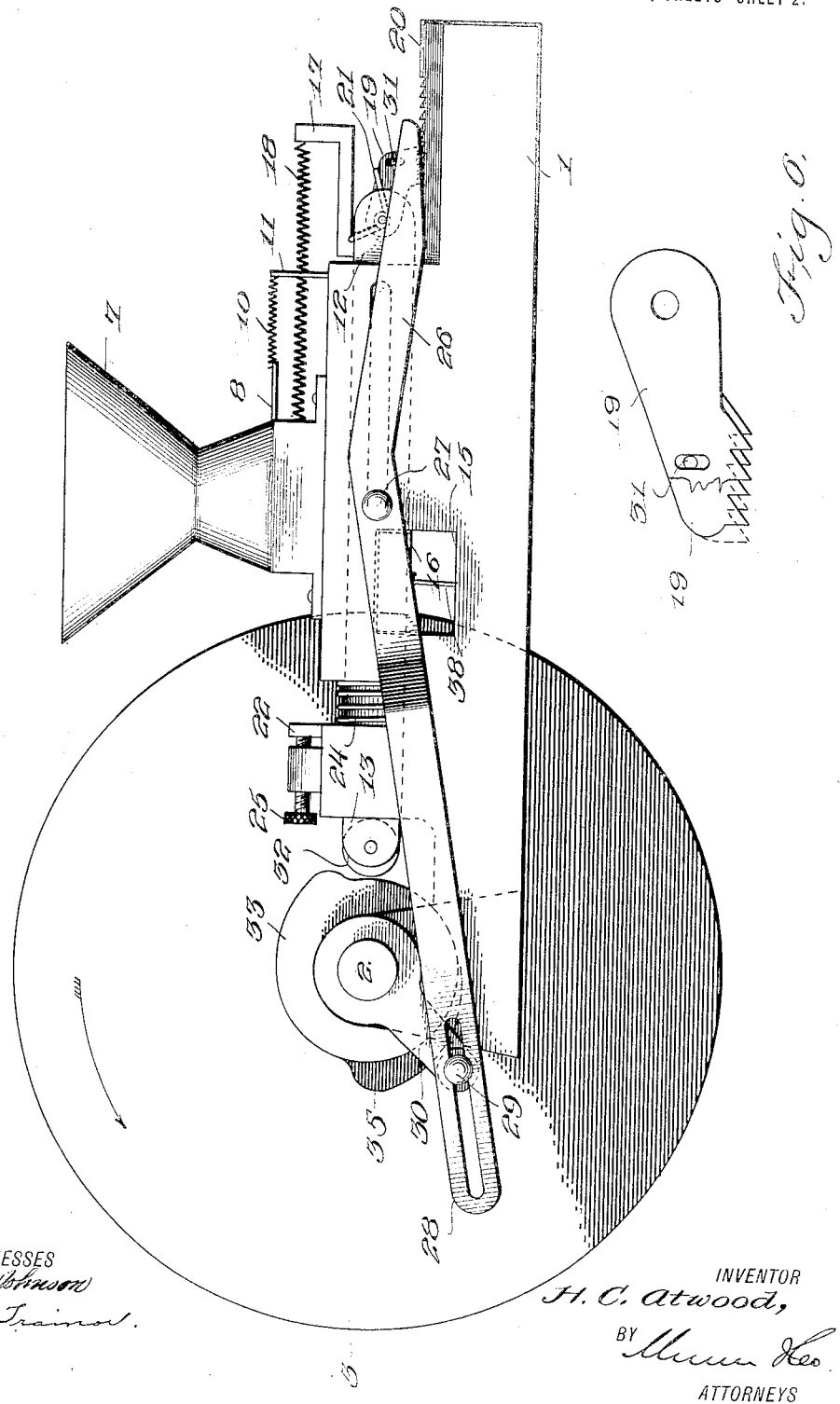

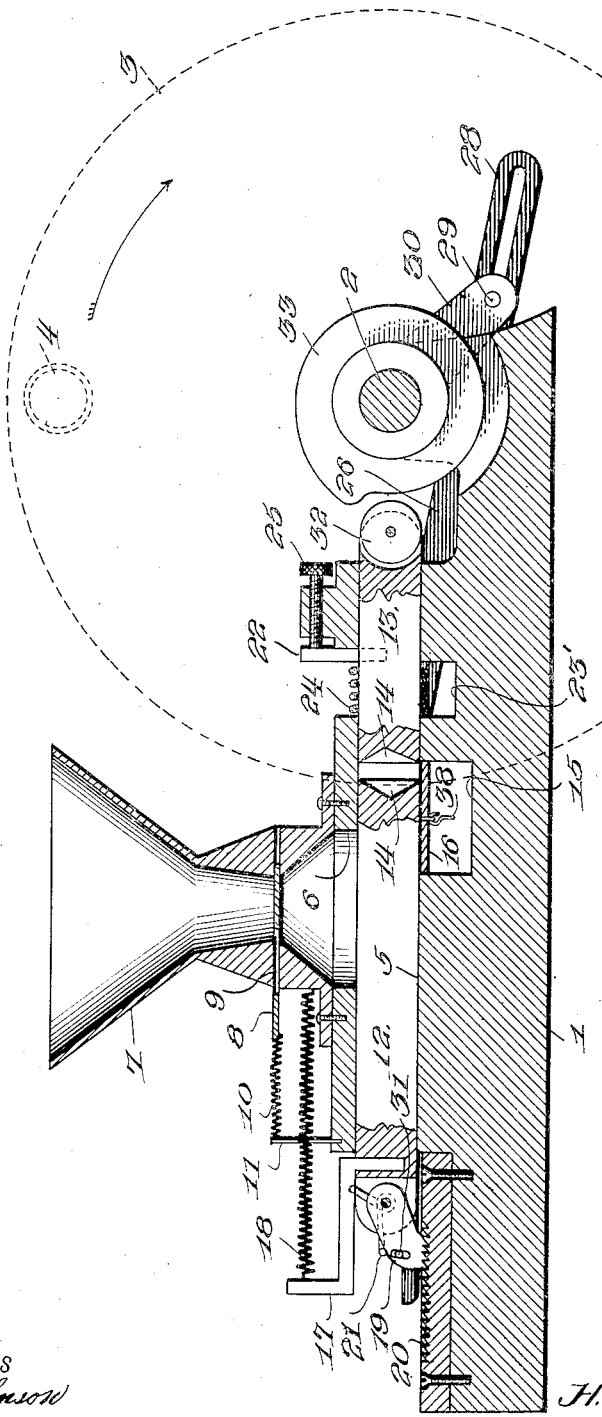

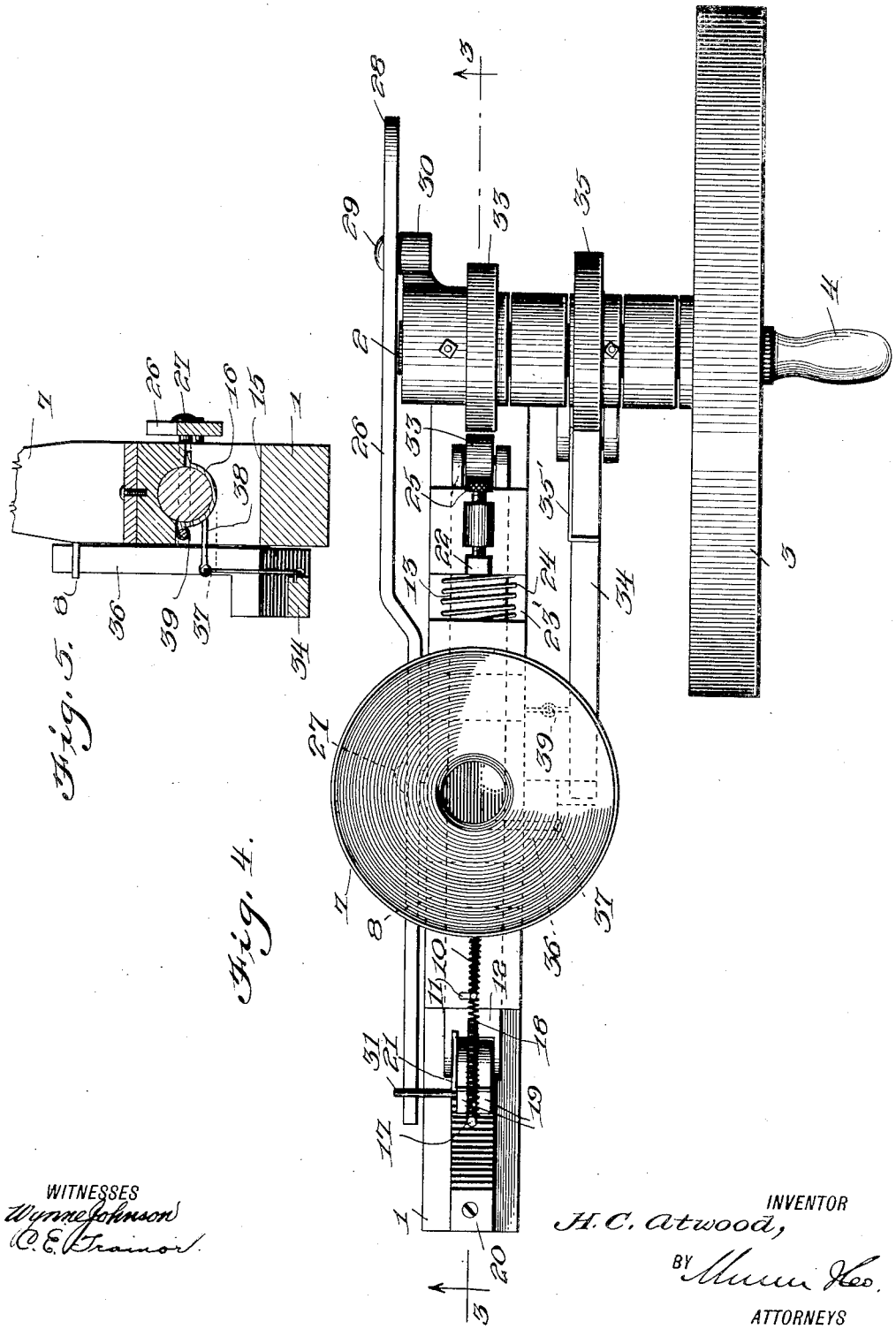

HARRY C. ATWOOD, OF ARDMORE, OKLAHOMA.

NUT-CRACKING MACHINE.

1,412,443.　　　Specification of Letters Patent.　　Patented Apr. 11, 1922.

Application filed January 25, 1921. Serial No. 439,788.

*To all whom it may concern:*

Be it known that I, HARRY C. ATWOOD, a citizen of the United States, and a resident of Ardmore, in the county of Carter and State of Oklahoma, have invented certain new and useful Improvements in Nut-Cracking Machines, of which the following is a specification.

My invention is an improvement in nut cracking machines, and has for its object to provide a simple, positively and rapidly operated machine of the character specified, designed to handle nuts of various sizes.

In the drawings:—

Figure 1 is a side view of the improved machine,

Figure 2 is a similar view looking from the opposite side,

Figure 3 is a section on the line 3—3 of Figure 4,

Figure 4 is a top plan view,

Figure 5 is a section taken substantially on the line 5—5 of Figure 1.

Figure 6 is a side view of the pawls.

In the present embodiment of the invention, a suitable base 1 is provided, having journaled transversely thereof at one end a shaft 2. This shaft is provided at one end with a balance wheel 3, and a crank arm 4 is connected eccentrically with the balance wheel to turn the shaft.

A cracking chamber 5 extends longitudinally of the base near its top, and at approximately the center of this chamber there is an opening 6, above which is arranged a hopper 7. This hopper communicates with the opening 6 and provides a means for feeding nuts to the cracking chamber.

A gate or valve 8 is movable transversely of the hopper between the same and the opening 6, and the valve or gate has an opening 9 adapted to register with the opening of the hopper under conditions to be presently described, to permit the passage of a single nut from the hopper to the cracking chamber.

A spring 10 is arranged between the gate or valve and an upstanding pin 11 on the base, and the spring acts normally to hold the valve in such position that the opening through the same is out of register with the opening of the hopper, and nuts cannot feed through the hopper to the cracking chamber.

Mechanism to be later described is provided for opening the gate or valve at predetermined moments to permit the nut to pass from the hopper to the cracking chamber. A pair of plungers 12 and 13 are arranged within the cracking chamber, the said plungers extending beyond the cracking chamber at each end, and each plunger has its inner end recessed as shown at 14 to receive the pointed ends of the nut, the said recesses being conical as shown.

There is provided an opening 15 leading from the cracking chamber laterally, for the passage of the cracked nuts, and this opening extends inwardly below the cracking chamber as shown in Figures 2 and 3. A door 16 is arranged within the opening 15 between the cracking chamber and the said opening, and this door 16 normally closes the said opening and prevents the passage of the nut in position between the cracking plungers.

The plunger 12 is provided at its outer end with an angle bar 17, and a coil spring 18 is arranged between the angle bar and the hopper, acting normally to hold the plunger in the position of Figure 3. A pair of pawls 19 are pivoted to the plunger 12 at its outer end and below the angle bar 17, and these pawls are adapted to engage a ratchet bar 20 which is secured within a rabbet in the base as shown. The pawls are normally pressed into engagement with the teeth by a spring 21, and they are lifted out of engagement with the teeth at predetermined moments by mechanism to be later described.

The plunger 13 has connected therewith an upstanding pin 22, which moves in a notch or recess 23' in the top of the base, the said notch or recess intersecting the cracking chamber as shown. A coil spring 24 encircles the plunger 13 in this notch and between the pin 22 and the inner end of the notch, and acts normally to force the plunger outwardly. The plunger may be adjusted inwardly, by means of a set screw 25 which is threaded through an upstanding lug on the base, and engages the pin 22. The engagement of the set screw with the pin limits the outward movement of the plunger, and defines the normal position of the plunger.

A lever 26 is pivoted intermediate its ends to the plunger 12, and that end of the lever adjacent to the shaft 2 is longitudinally slotted as shown at 28, for engagement by a headed pin 29 on a crank arm 30 secured to the shaft 2. The other end of the lever 26 is in position to engage a pin 31 having a lost motion connection with one of the pawls 19 and a rigid connection with the other. That pawl or dog 19 adjacent to the lever has a slot through which the pin extends, and the end of the pawl adjacent to the other dog is rigid therewith.

It will be obvious that when the lever is swung the dog 19 remote from the lever will first be lifted after which the dog adjacent to the lever will be lifted. The plunger 13 is provided at its outer end with a roller 32, and this roller is adapted to be engaged by a cam 33 on the shaft 2, before mentioned.

A second lever 34 is pivoted to the base intermediate its ends as indicated at 35', and that end of the lever adjacent to the shaft 2 moves in contact with a cam 35 on the said shaft. The opposite end of the lever engages the lower end of the slide operating lever 36 which is pivoted to the base as indicated at 37 intermediate its ends, and which is connected with the gate or valve at its upper end. The lower end of the lever 36 is beveled, and is engaged by the adjacent end of the lever 34.

The arrangement is such that when that end of the lever 34 adjacent to the shaft 2 is moved downward by the cam, the other end of the lever moving upward will swing the lever 36 and cause it to open the gate 8. The gate 16, before mentioned, which is hinged at 39 at one of its edges is connected by links 38 with the lever 34, and when this lever moves upward after it has been moved downward by the cam, the gate will be opened, to permit the cracked nut to escape.

The operation of the device is as follows: The nuts are fed into the hopper one at a time, for but a single nut may feed from the hopper at a time. When the shaft 2 is rotated with the parts in the position of Figure 3, the cam 35 will first engage the lever 34 and will swing the lever to cause the lever 36 to open the slide or valve 8. As the slide or valve opens a nut feeds through the opening of the slide, and falls upon the plunger 12 which is still in the position of Figure 3, and it will be noticed that there is ample room for the nut between the slide and the plunger.

A continuation of the rotation of the shaft 2 in the direction of the arrow shown in Figure 1, will eventually cause the headed pin 29 to engage the inner end of the slot 28 in the lever 26. Further movement of the crank arm will move the lever longitudinally, carrying with it the plunger 12, and the plunger will be moved outwardly until the nut now below the feed slide can fall into the cracking chamber between the plungers 12 and 13.

Before the plunger 12 begins to move outwardly however, that end of the lever 26 adjacent to the pawls 19 will have engaged the pin 31, and will have lifted the said pin and the pawls or dogs, moving them out of engagement with the ratchet bar and releasing the plunger 12, so that it may move outwardly. The nut is now between the plungers 12 and 13 in the cracking chamber, and the crank arm is now on the upper side of the shaft 2, and the lever 26 together with the plunger begins to move toward the plunger 13 carrying with it the nut. When the nut engages the plunger 13, the inward movement of the plunger 12 will be checked, and it will be locked against outward movement by engagement of the pawls with the ratchet bar.

The lost motion connection between the lever 26 and the shaft 2 permits the shaft to continue to rotate without interference with the plunger, the lever 26 merely swinging slightly on its pivotal connection 27, but not moving longitudinally for the moment.

Eventually the cam 33 will engage the roller 32, and will move the plunger 13 toward the plunger 12, clamping the plungers on the nut, and cracking the shell of the nut. At the moment that the lever 34 reaches the end of its upward movement, the gate 16 is opened, when the cam 33 moves past the roller 32, permitting the plunger 13 to move outward under the influence of the spring 24, the cracked nut will fall through the gate and out through the opening 15.

Referring to Figure 5 it will be seen that the gate 16 has an arm extending beyond the hinge 39 of the gate. This arm is connected by a link 38 with the lever 34. Referring to Figure 6 it will be noticed that the teeth of the two pawls are staggered with respect to each other, the teeth of one pawl being half-way between those of the other. This has the same effect as if the teeth on the pawl and ratchet were of one half their size, while at the same time the teeth are very strong because of their size.

The recessing of the plungers at their meeting ends provides for the receiving of the pointed ends of the nuts, the said pointed ends fitting in the recess.

I claim:—

1. A nut cracker comprising a base having a cracking chamber, a plunger slidable within said chamber, a feed hopper supplying nuts to said chamber, said chamber being provided at a point spaced from said hopper and adjacent the cracking point with discharge means, one of said plungers being normally extended beyond the discharge end of said hopper to close the discharge end of the hopper, means to retract said plunger to permit of the entrance of a nut into said cracking chamber, and means to advance said plunger to close the discharge end of said hopper and to push the nut to the cracking point.

2. A nut cracker comprising a base having a cracking chamber, a plunger slidable within said chamber, a feed hopper supplying nuts to said chamber, said chamber being provided at a point spaced from said hopper and adjacent the cracking point with discharge means, said plunger being normally extended beyond said hopper to close the discharge end of the same, means to retract said plunger to permit of the entrance of a nut into said cracking chamber, means to advance said plunger to close said hopper and to push the nut to the cracking point, and means cooperating with said plunger to crack the nut.

3. A nut cracker comprising a base having a cracking chamber of elongated formation, a plunger slidable within said chamber, a feed hopper supplying nuts to said chamber, said chamber being provided at a point spaced from said hopper and adjacent the cracking point with discharge means, said plunger being normally extended beyond said hopper to close the discharge end of the same, means to retract said plunger to permit of the entrance of a nut into said cracking chamber, means to advance said plunger to close said hopper and to push the nut to the cracking point, means co-operating with said plunger to crack the nut, and a dog pivotally carried by said plunger to hold the plunger detachably in position.

4. A nut cracker comprising a base having a cracking chamber of elongated formation, a plunger slidable within said chamber, a feed hopper supplying nuts to said chamber, said chamber being provided at a point spaced from said hopper and adjacent the cracking point with discharge means, said plunger being normally extended beyond said hopper to close the discharge end of the same, means to retract the plunger to permit of the entrance of a nut into said cracking chamber, means to advance said plunger to close said hopper and to push the nut to the cracking point, means cooperating with said plunger to crack the nut, a dog pivotally carried by said plunger to hold the plunger detachably in position, and means to periodically release said dog.

5. A nut cracker comprising a base having a longitudinally extending cracking chamber of elongated formation, a hopper for supplying nuts singly to said chamber, said hopper being spaced from the cracking point of the chamber, a plunger slidable in said chamber and adapted to move the nuts along the cracking chamber from the hopper to the cracking point, a ratchet bar carried by said base, a dog pivotally carried by said plunger and engaging said bar to hold the plunger in position, a lever pivoted intermediate its ends to said plunger and having one end portion connected with said dog to periodically elevate the same, an operating device connected with the other end of said lever to swing the same on its pivot and move the lever longitudinally whereby to move the plunger to its retracted position subsequent to the release of said dog with said ratchet bar, and means carried by the body and cooperating with said plunger to crack the nut.

6. A nut cracker having a base having a longitudinally extending cracking chamber of elongated formation, a hopper for supplying nuts singly to said chamber, said hopper being spaced from the cracking point of the chamber, a plunger slidable in said chamber and adapted to move the nuts along the cracking chamber from the hopper to the cracking point, a ratchet bar carried by said base, a dog pivotally carried by said plunger and engaging said bar to hold the plunger in position, a lever pivoted intermediate its ends to said plunger and having one end portion connected with said dog to periodically elevate the same, an operating device connected with the other end of said lever to swing the same on its pivot and move the lever longitudinally whereby to move the plunger to its retracted position subsequent to the release of said dog with said ratchet bar, means carried by the body and cooperating with said plunger to crack the nut, and a spring to urge the plunger to its inward position.

7. A nut cracking machine comprising a base having a longitudinally extending cracking chamber of elongated formation, a hopper for supplying said chamber with nuts, said hopper being located above the chamber and spaced laterally from the cracking point, a plunger slidable in said chamber and normally closing the discharge end of said hopper a dog pivoted to said plunger, means carried by said base and engaged by said dog whereby to detachably hold the plunger in position, said dog being provided with a laterally directed plunger, a lever pivoted intermediate its ends to said plunger and having one end engaged with said pin whereby to periodically elevate the same, the other end of said lever being provided with a longitudinally extending slot, a crank having a laterally directed pin slidable in said slot and adapted to engage one end wall of the same to move the lever and said plunger longitudinally whereby the plunger is retracted for permitting of the entrance of a nut into said chamber from said hopper, a shaft connected to said crank, a cam mounted on said shaft, a second plunger slidable in said passage and operated by said cam, and means to normally hold said second named plunger in its retracted position.

8. A nut cracking machine comprising a base having a longitudinally extending cracking chamber of elongated formation, a hopper for supplying said chamber with nuts, said hopper being located above the chamber and spaced laterally from the cracking point, a plunger slidable in said chamber and normally closing the discharge end of said hopper a dog pivoted to said plunger, means carried by said base and engaged by said dog whereby to detachably hold the plunger in position, said dog being provided with a laterally directed plunger, a lever pivoted intermediate its ends to said plunger and having one end engaged with said pin whereby to periodically elevate the same, the other end of said lever being provided with a longitudinally extending slot, a crank having a laterally directed pin slidable in said slot and adapted to engage one end wall of the same to move the lever and said plunger longitudinally whereby the plunger is retracted for permitting of the entrance of a nut into said chamber from said hopper, a shaft connected to said crank, a cam mounted on said shaft, a second plunger slidable in said passage and operated by said cam, means to normally hold said second named plunger in its retracted position, a door pivoted to said base and forming a portion of the bottom wall of said passage, and means to normally swing said door on its hinge whereby the nuts are discharged laterally of the base.

HARRY C. ATWOOD.